(12) United States Patent
Price et al.

(10) Patent No.: US 10,521,938 B1
(45) Date of Patent: Dec. 31, 2019

(54) SYSTEM AND METHOD FOR SMOOTHING COMPUTER ANIMATION CURVES

(71) Applicant: Pixar, Emeryville, CA (US)

(72) Inventors: Jayson G. Price, Dublin, CA (US); Thomas A. Hahn, Piedmont, CA (US)

(73) Assignee: Pixar, Emeryville, CA (US)

( * ) Notice: Subject to any disclaimer, the term of this patent is extended or adjusted under 35 U.S.C. 154(b) by 0 days.

(21) Appl. No.: 16/115,300

(22) Filed: Aug. 28, 2018

(51) Int. Cl.
*G06T 15/00* (2011.01)
*G06T 13/20* (2011.01)
*G06T 11/40* (2006.01)
*G06F 17/17* (2006.01)

(52) U.S. Cl.
CPC ............... *G06T 11/40* (2013.01); *G06F 17/17* (2013.01); *G06T 13/20* (2013.01); *G06T 15/005* (2013.01); *G06T 2215/06* (2013.01)

(58) Field of Classification Search
CPC ....... G06T 11/20; G06T 11/203; G06T 13/00; G06T 13/20; G06T 15/005; G06T 2207/20096; G06T 2215/06
See application file for complete search history.

(56) References Cited

U.S. PATENT DOCUMENTS

2006/0274070 A1* 12/2006 Herman ................ A63F 13/10
345/474
2012/0050293 A1* 3/2012 Carlhian ............... G06T 11/203
345/442
2014/0240322 A1* 8/2014 Brumer ................. G06T 11/203
345/442
2018/0025525 A1* 1/2018 Hessler ................... G06T 19/20
345/420

OTHER PUBLICATIONS

Calculation of a tangent vector at any point of a given polyline curve so that the polyline can be converted into a smooth parametric curve, Nov. 10, 2000, IBM, Publication No. RD 439119, 3 pgs. (Year: 2000).*

* cited by examiner

*Primary Examiner* — Jeffery A Brier
(74) *Attorney, Agent, or Firm* — Patterson + Sheridan, LLP

(57) ABSTRACT

Techniques for smoothing curves used in computer animation are disclosed. In one embodiment, a smoothing application determines a number of tangents to a curve in response to a modification to a knot or the addition of a new knot, by first determining phantom tangents at knots that are neighbors of each knot that is processed. The smoothing application then (1) determines a length of each side of the tangent at each knot being processed as 1/N times the x-axis distance to a neighboring knot on the same side, (2) determines initial angles of the tangent at each knot being processed by pointing a tip of each side of the tangent at a near tip of a previously determined phantom tangent on the same side, and (3) reconciles the initial angles determined for the tangent at each knot being processed by taking a weighted sum of those initial angles.

20 Claims, 6 Drawing Sheets

SYSTEM AND METHOD FOR SMOOTHING COMPUTER ANIMATION CURVES

BACKGROUND

Field of the Invention

The present disclosure relates to the field of computer animation, and in particular, to smoothing curves used in computer animation.

Description of the Related Art

In the field of computer graphics and animation, computer graphic images can be created by mathematically modeling the interaction of light with a three dimensional scene from a given viewpoint. This process, called rendering, generates a two-dimensional image of the scene from the given viewpoint and is analogous to taking a photograph of a real-world scene. Animated sequences can be created by rendering a sequence of images of a scene as the scene is gradually changed over time. A great deal of effort has been devoted to making realistic looking rendered images and animations.

SUMMARY

One embodiment provides a computer-implemented method of animating an object. The method generally includes receiving a modification to at least one knot. The method further includes, for each knot of a plurality of knots: determining phantom tangents to a curve at knots neighboring the knot, determining a respective length of each side of a tangent to the curve at the knot as a ratio of a horizontal distance between the knot and a neighboring knot on the same side, determining a respective initial angle of each side of the tangent at the knot by pointing a tip of the tangent at a near tip of one of the phantom tangents on the same side, and reconciling the initial angles via a weighted average of the initial angles. In addition, the method includes determining the curve based, at least in part, on the plurality of knots and the tangents at the plurality of knots, and generating an animation of the object using the determined curve.

Further embodiments provide a non-transitory computer-readable medium that includes instructions that, when executed, enable a computer to implement one or more aspects of the above method, and a computer system programmed to implement one or more aspects of the above method.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
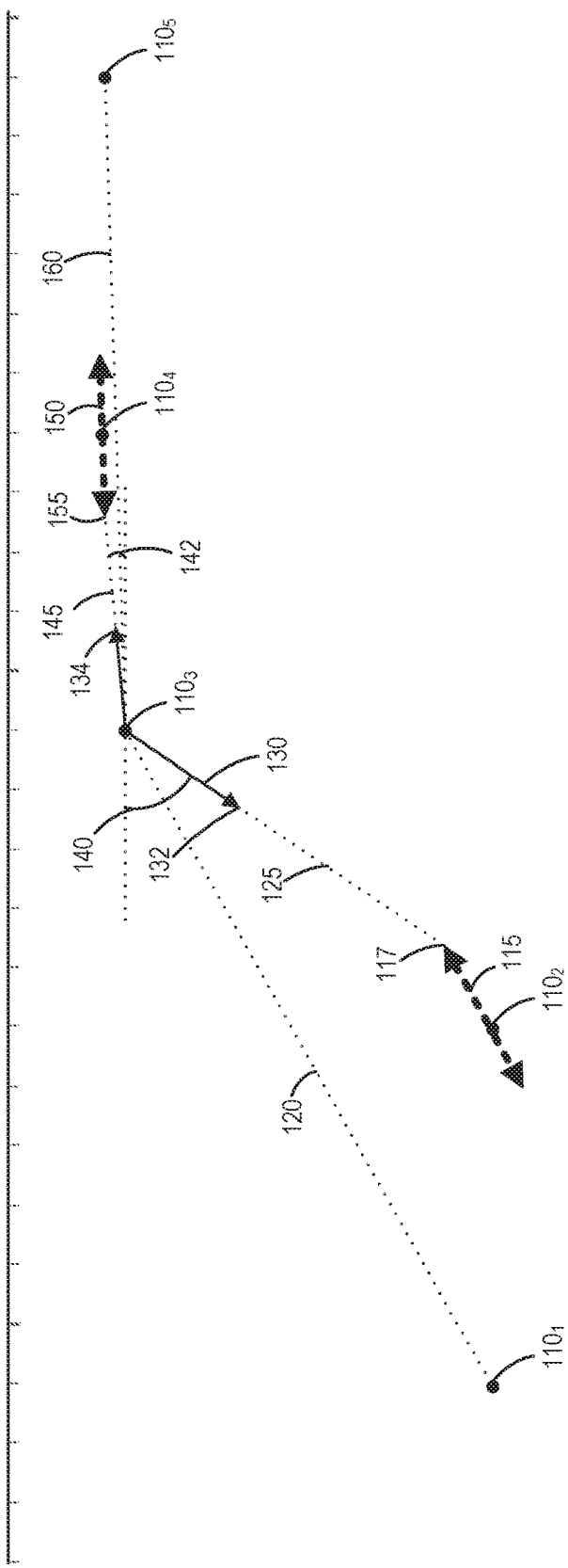
FIG. 1 illustrates an approach for smoothing a curve, according to an embodiment.

This disclosure provides techniques for smoothing curves used in computer animation. A curve, such as a spline that is formed from a number of segments connected together at a set of knots, may be used to specify how a computer animation is interpolated, with the curve representing a rate of change of attribute(s) during the animation. Such a curve may pass through adjustable knots, and tangents to the curve may be defined at those knots to control smoothness of the animation and the rate at which the animation eases in or out of keyframes associated with the knots. In one embodiment, a smoothing application determines a number of tangents to a curve, in response to a modification to a knot or the addition of a new knot, by first determining phantom tangents at knots that are neighbors of each knot being processed, and then (1) determining a length of each side of the tangent at each knot being processed as 1/N times the x-axis distance to a neighboring knot on the same side, with a default value of 3 for N; (2) determining initial angles of the tangent at each knot being processed by pointing a tip of each side of the tangent at a near tip of a previously determined phantom tangent on the same side; and (3) reconciling the initial angles determined for the tangent at each knot being processed by taking a weighted sum of those initial angles. In such a case, each of the phantom tangents at one of the knots may have an angle that is determined by making the phantom tangent parallel to a line connecting neighboring knots, and each phantom tangent may further have a length on each side (of one of the knots associated with the phantom tangent) that is determined as a ratio (e.g., 1/4) of the x-axis distance to a neighboring knot on the same side.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a smoothing application) or related data available in the cloud. For example, the smoothing application could execute on a computing system in the cloud and smooth curves that are used in animation. In such a case, the smoothing application could perform the smoothing of a curve and store the smoothed curve at a storage location in the cloud. Doing so allows a user to access this information from any computing system attached to a network connected to the cloud (e.g., the Internet).

Referring now to FIG. 1, an approach for smoothing a curve according to an embodiment is shown. Assume that a user modifies the location of a knot $110_3$. A smoothing application (e.g., the smoothing application 622 discussed below with respect to FIG. 6) is configured to calculate updated tangents to a curve at the modified knot $110_3$, as well as other knots that are up to two knots away from the modified knot $110_3$, to account for the modification to the knot's $110_3$ location. The calculation of the tangent at the knot $110_3$, which may be performed in real time responsive to a modification to the knot $110_3$ by a user in one embodiment, is described in detail with respect to FIG. 1 as an example.

In general, tangents to the curve at the knots $110_{1-5}$ are used to control smoothness of an animation and the rate at which the animation eases in or out of keyframes associated with the knots $110_{1-5}$. As described, a curve may be used to specify how an animation is interpolated, with the curve representing a rate of change of attribute(s) during the animation. Such a curve may include a number of segments joined together at knots (e.g., the knots $110_{1-5}$), each of which may be associated with a respective keyframe. That is, the curve is constrained by the knots such that the curve passes through each of the knots. In addition, tangents to the curve may be defined at the knots to control the smoothness of the animation, as well as the rate at which the animation eases in or out of each of the keyframes. A keyframe may generally pair animation variable value(s) with a time instant that the value(s) are in effect. For example, keyframes may define poses that a three-dimensional (3D) character should hit. Keyframes may or may not be present for all time values, and there are several public and also proprietary techniques for interpolating (i.e., filling in unknown data) the values of animation variables at times in between keyframes to update the appearance and motion of an animated object between keyframes. Animation variables, which are sometimes referred to as avars, are variables that may be used to specify the position and/or orientation of an animated object, such as a 3D character model, among other things. More complicated animation variables may be used to abstract complicated modifications of a model to a relatively simple control. Avar values may generally vary over time to produce the animation effect observed by a viewer, and avars may be used by complicated functions, such as deformers, to modify the pose or bodily position of an animated object. Complicated animation variables can define, e.g., the degree of opening of a character's mouth, and the value of an animation variable may be processed and transformed internal to rigging, with results provided to one or more complicated deformer functions to control the position, orientation, and deformation of many different parts of the character model needed to open the character's mouth to a desired degree. As another example, a height avar may be changed over time to make a character jump in an animation, with keyframes being used to specify the height of the character at different time instances and a curve being used to specify how to interpolate between keyframes. In such a case, the x-axis may represent time (e.g., in terms of frame number) and the y-axis may represent height.

A tangent 130 at the knot $110_3$ may be defined by its length and angle with respect to the x-axis. As used herein, a "tangent length" refers to the length of the x-axis projection (i.e., a horizontal component) of the tangent, and it should be understood that a vertical component of the tangent may be determined from the horizontal component of the tangent and an angle of the tangent. In order to determine the tangent 130 at the knot $110_3$, the smoothing application first determines phantom tangents 115 and 150 at knots $110_2$ and $110_4$, respectfully, that are neighbors of the knot $110_3$. As used herein, a "phantom tangent" (e.g., phantom tangents 115 and 150) is a temporary construct used in the smoothing process to determine actual tangents to the curve, and a "neighboring" knot is a knot that is adjacent to another knot on either a left or a right side. Illustratively, an angle of the phantom tangent 115 at the knot $110_2$ is determined by making the phantom tangent 115 parallel to a line 120 connecting the knots $110_1$ and $110_3$ that are neighbors of the knot $110_2$. That is, the smoothing application may determine an angle formed by the line 120 with respect to the x-axis, and then use that same angle as the angle of the phantom tangent 115 with respect to the x-axis. Similarly, the smoothing application may determine the angle of the phantom tangent 150 by making the phantom tangent 150 parallel to a line 160 connecting the knots $110_3$ and $110_5$ that are neighbors of the knot $110_4$.

The smoothing application further determines a length of the phantom tangent 115 on each side of the knot $110_2$ as a ratio of the x-axis distance from the knot $110_2$ to one of the neighboring knots $110_1$ and $110_3$ on that side. In one embodiment, a ratio of 1/4 may be used. In such a case, the phantom tangent 115 length on the side of the knot $110_1$ may be determined as 1/4 of the x-axis distance from the knot $110_1$ to the knot $110_2$, and the phantom tangent 115 length on the side of the knot $110_3$ may be 1/4 of the x-axis distance from the knot $110_2$ to the knot $110_3$. Similarly, the phantom tangent 150 length on the side of the knot $110_3$ may be 1/4 of the x-axis distance from the knot $110_3$ to the knot $110_4$, and the phantom tangent 150 length on the side of the knot $110_5$ may be determined as 1/4 of the x-axis distance from the knot $110_4$ to the knot $110_5$.

Subsequent to determining the phantom tangents 115 and 150, the smoothing application determines an initial angle and length of each side of the tangent 130 at the knot $110_3$. In one embodiment, the smoothing application may determine a length of each side of the tangent 130 as a ratio of an x-axis distance to a neighboring knot on that side. In particular, a ratio of 1/N may be used, where N is a parameter that is adjustable on a per-knot basis and allows a user to bias the result to produce longer or shorter tangents at each of the knots. Further, N may initially be set to a default value of 3 in one embodiment. For example, the tangent 130 length on the side of the neighboring knot $110_2$ may be determined as 1/N (e.g., 1/3 or some other user-specified value such as 1/5 or 1/7) times the x-axis distance from the knot $110_2$ to the knot $110_3$, and the tangent 130 length on the side of the neighboring knot $110_4$ may be 1/N (e.g., 1/3 or another user-specified value) times the x-axis distance from the knot $110_3$ to the knot $110_4$. The intuition behind making the tangent length a ratio of the x-axis distance to a neighboring knot is that, if the x-axis distance to the neighboring knot is shorter, then the tangent length should also be shorter to avoid overshooting, which is discussed in greater below.

In addition to determining the lengths of each side of the tangent 130, the smoothing application further determines an initial angle 140 of the tangent 130 on the side of the knot $110_2$ as an angle formed between the tangent 130 and the x-axis when a tip 132 of the tangent 130 is directly pointed at a tip 117 of the phantom tangent 115. That is, the near tip 117 of the phantom tangent 115 is used as an angle target for determining the initial angle 140. Similarly, the smoothing application may determine the initial angle 140 as an angle formed between the tangent 130 and the x-axis when another tip 134 of the tangent 130 is directly pointed at a tip 155 of the phantom tangent 150.

As shown, the initial angle 140 of the tangent 130 on the side of the knot $110_2$ is larger in absolute value than the initial angle 142 on the side of the knot $110_4$. However, it should be understood that the larger initial angle may generally be on either side of the knot $110_3$. In order to obtain a final angle for the tangent 130 at the knot $110_3$, the smoothing application reconciles the initial angles 140 and 142 on each side of the knot $110_3$ into a final tangent angle.

Let the initial angle 140 with the larger absolute value be denoted by L and the initial angle 142 with the smaller absolute value be denoted by S. In one embodiment, the smoothing application determines a weighted average of the two initial angles L and S. In such a case, the smoothing application may first determine a value A between 0 and 1 which is used to linearly interpolate between the initial angles L and S. Let q=L/(L+S). Then, A may be determined by raising q to its own power, i.e., $A=q^q$. Having obtained A, the smoothing application may determine the final tangent angle as the weighted average FinalAngle=((1−A)×L)+(A× S). The tangent at the knot 110₃ is then a tangent which has (1) FinalAngle as its angle, and (2) a length on each side equal to 1/N times the x-axis distance to a neighboring knot on that side, as described above.

Use of phantom tangents is advantageous because, if actual tangents were used, then moving any knot up or down would affect that knot's tangent endpoints (which would also translate up or down), and the effect could ripple out to all other knots. In particular, the tangents at all of the other knots would have to rotate to point at the new location of their neighboring tangents, which is slow and may be undesirable, as a local change can affect the entire animation. By contrast, pointing at phantom tangents as disclosed herein ensures that modifying one knot affects the tangents at knots that are at most two knots away in either direction from the modified knot, as a phantom tangent only depends on the values of its two neighboring knots. The property that modifying the position of one knot affects tangents to a curve at most a given number of knots away from the modified knot, as opposed to affecting the tangents to the curve globally, is referred to herein as "locality." For example, if a hypothetical knot to the right of the knot 110₅ were to be modified, it would have no effect on the phantom tangent 150 and, as a result, no effect on the construction of the tangent 130 at the knot 110₃. If the tangent at one knot is currently flat, then modifying a neighboring knot on one side will not affect the tangent at a neighboring knot on the other side. That is, the modification to the neighboring knot will affect the tangent at a knot that is only one, but not two, knots away. For example, if a tangent at the knot 110₃ were currently flat and the location of the knot 110₂ were to be changed, then a tangent at the knot 110₄ will not change. However, the currently flat tangent at the knot 110₃ will itself change if the location of the knot 110₂ were to be moved. For example, if the knot 110₂ were moved above the knot 110₃ in value and the knot 110₄ were below the knot 110₃ in value, then the tangent at the knot 110₃ would become non-flat. As another example, if the knot 110₂ were moved to the left or right, then the currently flat tangent at the knot 110₃ would change in length.

Although computation of the tangent 130 at the knot 110₃ is shown for illustrative purposes, tangents may also need to be determined for knots, such as the first knot of a curve, that do not have two neighboring knots. In one embodiment, the smoothing application may force the first knot (assuming it is smooth) to always have flat tangents on both sides. In such a case, the "inside" tangent length may be determined as above (i.e., as 1/N times the x-axis distance to a neighboring knot on that side), and the outside tangent length may be made to match the inside tangent length.

Figure 2:
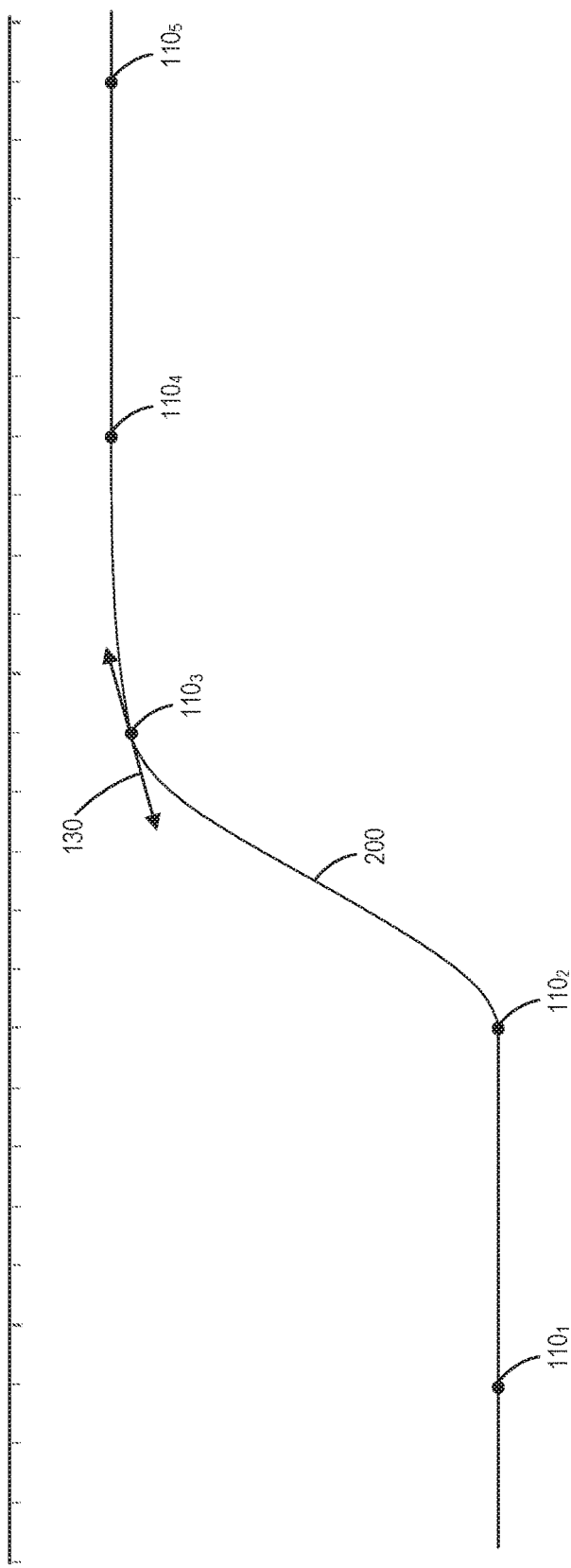
FIG. 2 illustrates an example of a smoothed curve, according to an embodiment.

FIG. 2 illustrates an example of a smoothed curve 200, according to an embodiment. As shown, the curve 200 passes through the knots 110₁₋₅ discussed above. Although a two-dimensional (2D) curve 200 is shown for illustrative purposes, the curve may be a 3D curve in some embodiments. As described, tangents to the curve 200 at the knots 110₁₋₅ (e.g., tangent 130) may be used to control smoothness of an animation and the rate at which the animation eases in or out of keyframes associated with the knots 110₁₋₅. In one embodiment, a smoothing application may determine the tangent (e.g., the tangent 130) at each knot (e.g., the knot 110₃ for the tangent 130) by determining phantom tangents at neighboring knots, determining lengths and initial angles of each side of the tangent at the knot, and reconciling the initial angles using a weighted average, as described above with respect to FIG. 1. The smoothing application may then generate the (smoothed) curve 200 using the determined tangents, as well as the knots and other tangents (e.g., tangents that were previously determined), if any, as constraints. Public and proprietary techniques are known for generating curves given knot and tangent constraints through, e.g., curve fitting.

As shown, the curve 200 does not "overshoot" any of the knots 110₁₋₅. Returning to the example of the height avar being changed over time to make a character jump in an animation, an overshoot may result in the character jumping higher than the height specified by a keyframe associated with a knot and then returning to the height specified by that keyframe, which may be undesirable. Such overshooting is not produced by the weighted averaging disclosed herein that reconciles the initial tangent angles on each side of a knot into a final tangent angle. In particular, as the smaller of the initial angles being averaged S goes to 0, the value of A, discussed above, goes to 1, and the final tangent angle determined through the weighted averaging goes to 0, thereby avoiding any overshooting.

Tangents at other knots may be determined in a similar manner (i.e., by determining phantom tangents at neighboring knots, determining lengths and initial angles of the tangents, and reconciling the initial angles) to how the tangent at the knot 110₃ is determined, and tangents at knots that do not have two neighbors, such as a first or last knot, may be made to be flat with a tangent length equal to 1/N times the x-axis distance to a neighboring knot on the inside, as described above. Further, the locality property of techniques disclosed herein ensures that a modification to one knot can only affect a tangent at that knot and the tangents at knots that are up to two knots away from the modified knot.

Figure 3:
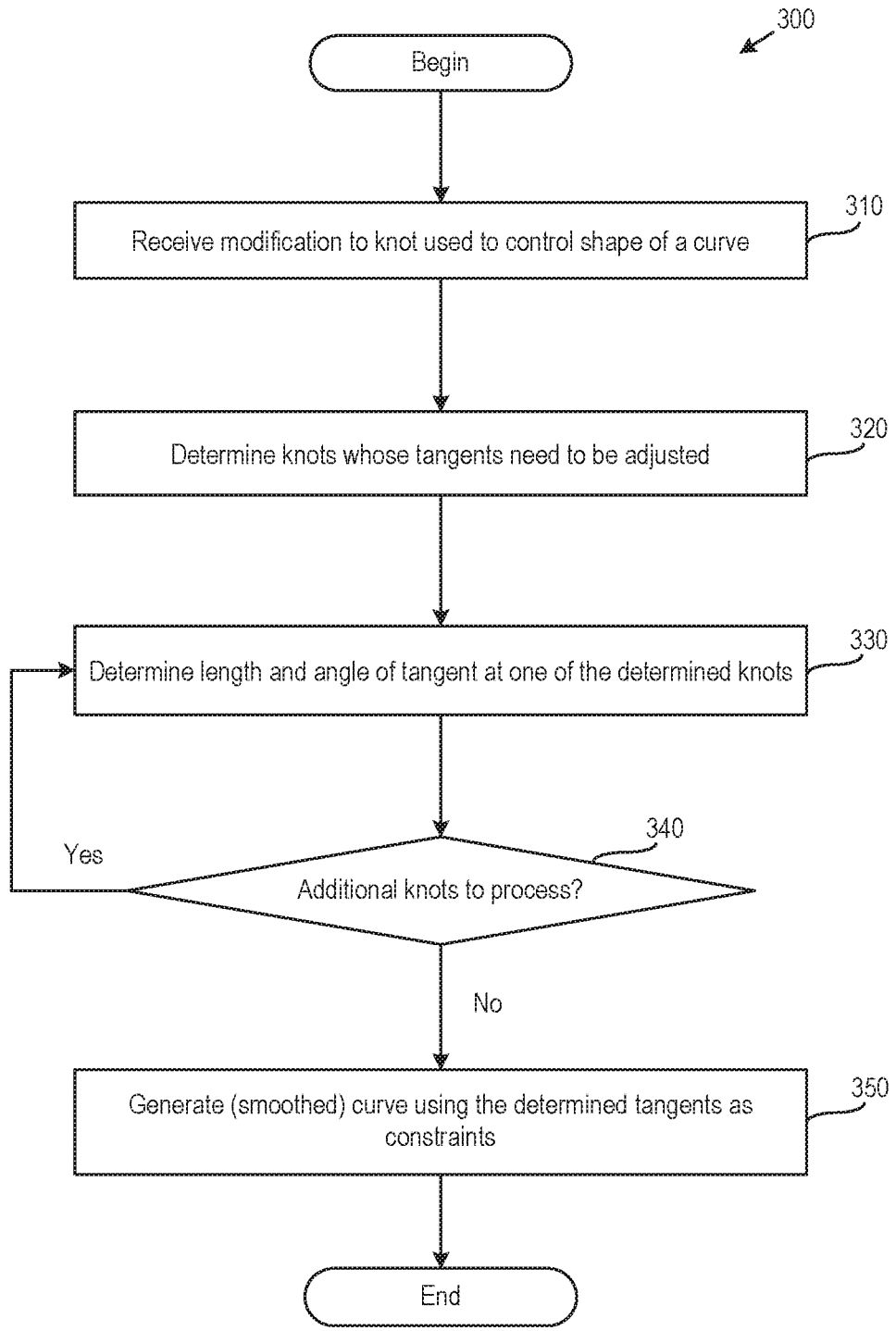
FIG. 3 illustrates a method of smoothing a curve, according to an embodiment.

FIG. 3 illustrates a method 300 of smoothing a curve, according to an embodiment. As shown, the method 300 begins at step 310, where a smoothing application receives a modification to a knot that is used to control the shape of a curve. For example, a user may utilize a graphical user interface (GUI) to move the position of the knot around, thereby changing its value. A knot may generally be moved up or down, or to the left or right in time. In response to such a modification to a knot, the smoothing application may automatically re-determine tangents and update the curve in real time (i.e., "live"), without requiring additional user input in one embodiment. In an alternative embodiment, the smoothing application may re-determine tangents and update the curve in response to additional user input, such as a click on a predefined button after the user has modified one or more knots. For illustrative purposes, it is assumed the modification to the knot that is received at step 310 does not require tangents to be determined for any knots, such as the first knot of the curve, that do not have two neighboring knots. As described, in case of the first knot (assuming it is smooth), the smoothing application may force the tangent at the first knot to have flat tangents on both sides, as well as determine the "inside" tangent length as 1/N times the x-axis distance to a neighboring knot on that side and the outside tangent length as matching the inside tangent length.

Although described for simplicity with respect to modifying one knot, it should be understood that multiple knots may be modified and the appropriate tangents determined using techniques disclosed herein. Further, although discussed herein primarily with respect to determining tangents in response to modifications made to knot(s), techniques disclosed herein may also be used to determine tangents when new knot(s) are created, i.e., tangents may be determined in response to the creation of new knot(s) and/or the modification of existing knot(s).

At step 320, the smoothing application determines knots whose tangents need to be adjusted as a result of the modification to the knot (or new knot) received at step 310. As described, modifying the position of one knot affects the tangents to a curve at most two knots away from the modified knot, rather than globally, as a result of locality. If the tangent at one knot is currently flat, then modifying a neighboring knot on one side will not affect the tangent at a neighboring knot on the other side, i.e., the modification will affect the tangent at a knot that is only one, but not two, knots away. In such a case, only the tangent at the knot that is one knot away needs to be adjusted in response to the modification.

Figure 4:
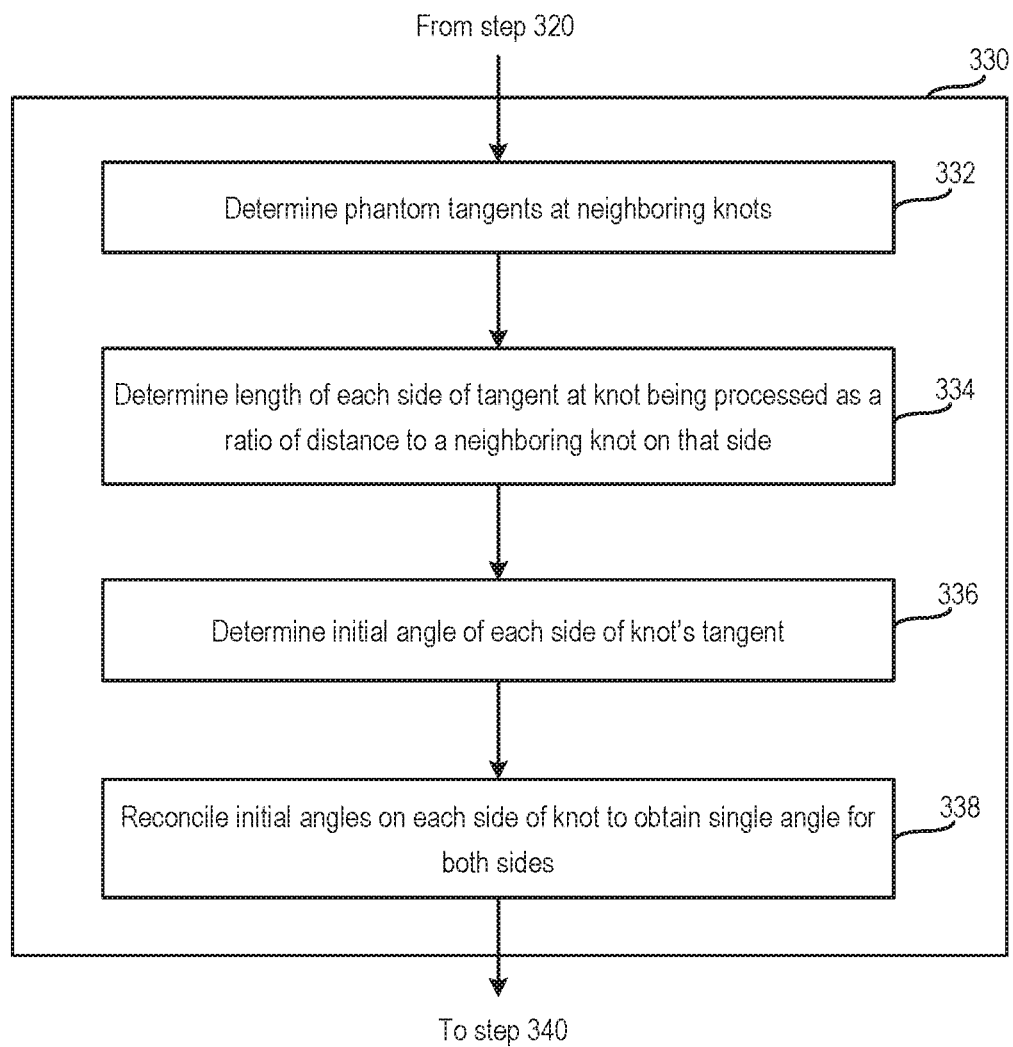
FIG. 4 illustrates in greater detail one of the steps of the method shown in FIG. 3, according to an embodiment.
Figure 5:
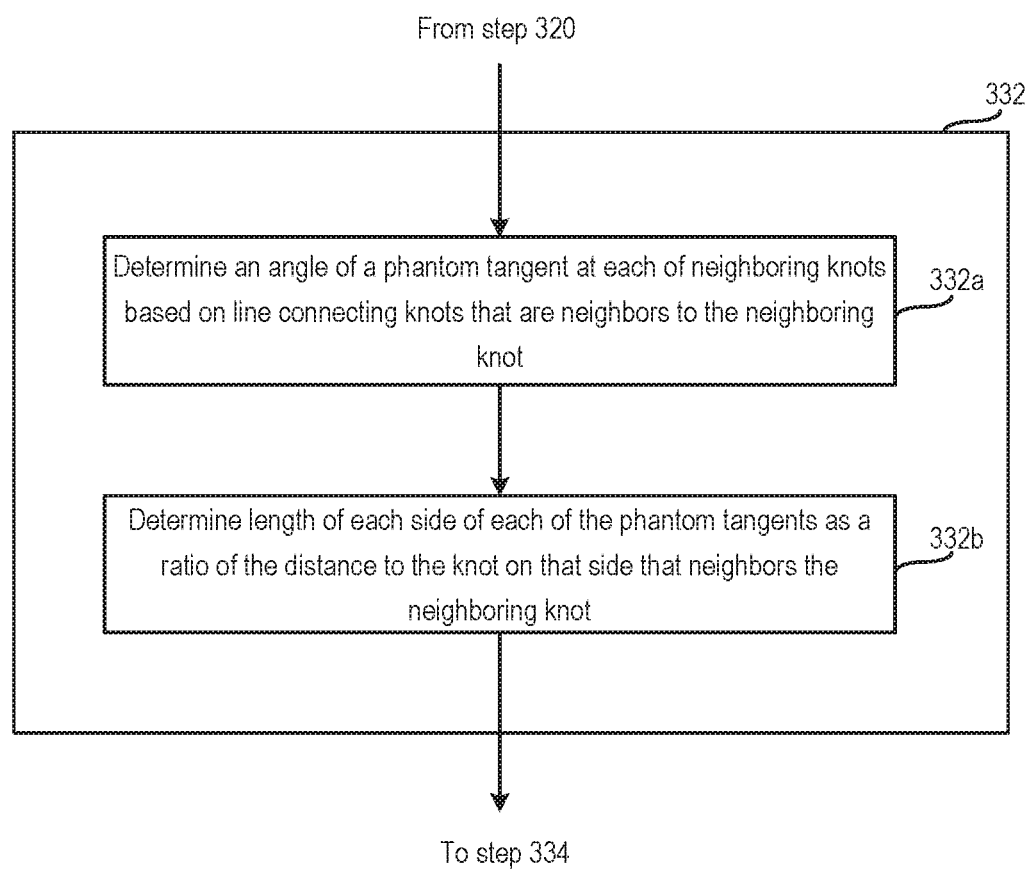
FIG. 5 illustrates in greater detail one of the method steps shown in FIG. 4, according to an embodiment.

At step 330, the smoothing application determines a length and angle of a tangent at one of the knots determined at step 320. Step 330 is illustrated in greater detail with respect to FIG. 4. As shown in FIG. 4, the smoothing application first determines phantom tangents at knots that neighbor the knot being processed at step 332. In one embodiment, the smoothing application determines a respective angle of the phantom tangent at each knot that neighbors the knot being processed, based on a line connecting knots that are neighbors of the neighboring knot at step 332a, as shown in FIG. 5. In particular, the smoothing application may determine an angle with respect to the x-axis of the line connecting the knots that are neighbors of the neighboring knot and use the same angle for the phantom tangent, i.e., make the phantom tangent parallel to the line connecting the neighbors of the neighboring knot associated with the phantom tangent.

Then at step 322b, the smoothing application determines a length of each side of each of the phantom tangents as a ratio of the distance to a knot on the same side that neighbors the neighboring knot associated with the phantom tangent. In one embodiment, the ratio used may be 1/4. In such a case, the smoothing application may determine, for each neighboring knot, a length of each side of the phantom tangent at the neighboring knot associated with the phantom tangent as 1/4 of the x-axis distance to a neighbor of the neighboring knot on the same side.

At step 334, the smoothing application determines a length of each side of a tangent at the knot being processed as a ratio of the distance to a neighboring knot on that side. In one embodiment, a ratio of 1/N may be used, where N is a user-adjustable parameter that can be set on a per-knot basis and has a default value of 3. That is, the smoothing application may store, for each knot, a user-specified value of N, or use the default value of 3 if the user has not specified a value of N. The user-adjustable parameter N allows a user to bias the result for generally longer or shorter tangents, as desired.

At step 336, the smoothing application determines an initial angle of each side of the tangent at the knot being processed. In one embodiment, the smoothing application may determine the initial angle of the tangent on each side of the knot as an angle formed between the tangent on that side and the x-axis when a tip of the tangent is directly pointed at a tip of a phantom tangent at a neighboring knot on the same side.

At step 338, the smoothing application reconciles the initial angles on each side of the knot to obtain a single angle for both sides. As described, assuming the initial angles determined at step 336 include a larger angle L and a smaller angle S, the smoothing application may determine a weighted average of L and S that avoids overshooting. In one embodiment, the smoothing application may first determine a value A used to linearly interpolate between the angles L and S, with A being determined as q raised to its own power, i.e., $A=q^q$, where $q=L/(L+S)$. After obtaining A, the smoothing application may determine the final tangent angle as the weighted average FinalAngle=$((1-A) \times L)+(A \times S)$.

At step 340, if any additional knots determined at step 320 require processing, then the method 300 returns to step 330, where the smoothing application determines a tangent length and angle at another one of the knots determined at step 320.

At step 350, the smoothing application generates the (smoothed) curve using, among other things (such as the knots themselves and other tangents), the determined tangents as constraints. As described, public and proprietary techniques are known for generating curves given knot and tangent constraints through, e.g., curve fitting.

Subsequent to generating the smoothed curve, an animation of an object may be generated by the smoothing application itself and/or another application, using the smoothed curve to define how the animation is interpolated. Such an animation may further be rendered and output to a display device.

Figure 6:
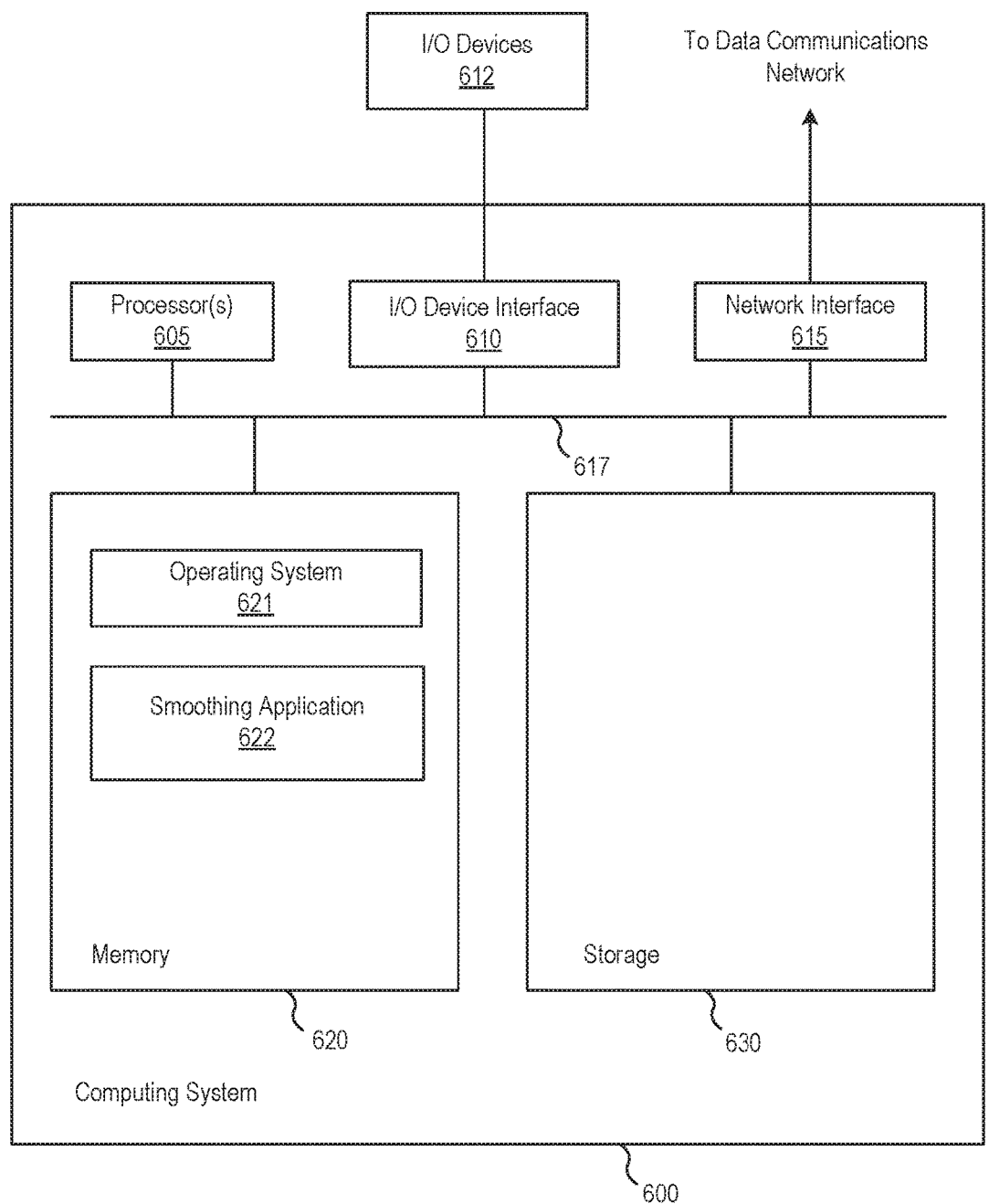
FIG. 6 illustrates a system in which an embodiment of this disclosure may be implemented.

FIG. 6 illustrates a system in which an embodiment of this disclosure may be implemented. As shown, the system 600 includes, without limitation, a central processing unit (CPU) 605, a network interface 615 connecting the system to a network 616, an interconnect 617, a memory 620, and storage 630. The system 600 may also include an I/O device interface 610 connecting I/O devices 612 (e.g., keyboard, display and mouse devices) to the system 600.

The CPU 605 retrieves and executes programming instructions stored in the memory 620. Similarly, the CPU 605 stores and retrieves application data residing in the memory 620. The interconnect 617 facilitates transmission, such as of programming instructions and application data, between the CPU 605, I/O device interface 610, storage 630, network interface 615, and memory 620. The CPU 605 is included to be representative of a single CPU, multiple CPUs, a single CPU having multiple processing cores, one or more graphics processing units (GPUs), any combination of the above, and the like. And the memory 620 is generally included to be representative of a random access memory. The storage 630 may be a disk drive storage device. Although shown as a single unit, the storage 630 may be a combination of fixed and/or removable storage devices, such as magnetic disk drives, flash drives, removable memory cards or optical storage, network attached storage (NAS), or a storage area-network (SAN). Further, system 600 is included to be representative of a physical computing system as well as virtual machine instances hosted on a set of underlying physical computing systems. Further still, although shown as a single computing system, one of ordinary skill in the art will recognize that the components of the system 600 shown in FIG. 6 may be distributed across multiple computing systems connected by a data communications network.

As shown, the memory 620 includes an operating system 621 and a smoothing application 622. The operating system 621 may be, e.g., Linux® or Microsoft Windows®. The smoothing application 622 is configured to smooth curves used in computer animation. In one embodiment, the smoothing application 622 may receive a modification to a knot that is used to control the shape of a curve; determine knots whose tangents need to be adjusted as a result of the modification; determine a respective tangent length and angle at each of the knots; and generate the (smoothed) curve using, among other things, the determined tangents as constraints, according to the method 300 discussed above with respect to FIGS. 3-5. The smoothed curve may then be used in the animation of an object, and the animation rendered and output to a display device, either by the smoothing application 622 itself or by another application (not shown) that is stored in the memory 620 or elsewhere.

Advantageously, techniques disclosed herein may be employed to smooth curves used in computer animation. Experience has shown that the weighted average smoothing disclosed herein closely mimics how animators want curves to look when manually smoothing the curves in many scenarios. As a result, techniques disclosed herein may be used to supplement or replace manual smoothing of curves. Further, the smoothing disclosed herein does not produce overshooting, and the use of phantom tangents ensures locality. In addition, a curve may be automatically updated in real time responsive to modifications made by user to a knot (or the creation of a new knot), without requiring additional user input.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method of animating an object, comprising:
   receiving a modification to at least one knot;
   for each knot of a plurality of knots:
      determining phantom tangents to a curve at knots neighboring the knot,
      determining a respective length of each side of a tangent to the curve at the knot as a first ratio of a horizontal distance between the knot and a neighboring knot on the side,
      determining a respective initial angle of each side of the tangent at the knot by pointing a tip of the tangent at a near tip of one of the phantom tangents on the side, and
      reconciling the initial angles via a weighted average of the initial angles;
   determining the curve based, at least in part, on the plurality of knots and the tangents at the plurality of knots; and
   generating an animation of the object using the determined curve.

2. The method of claim 1, wherein the weighted average has form FinalAngle=$((1-A) \times L)+(A \times S)$, L being a larger of the initial angles, S being a smaller of the initial angles, and $A=q^q$, where $q=L/(L+S)$.

3. The method of claim 1, wherein the plurality of knots includes the at least one knot that is modified and knots that are two or fewer knots away from the at least one knot that is modified.

4. The method of claim 1, wherein the first ratio is a user-adjustable parameter with a default value of 1/3.

5. The method of claim 1, wherein each phantom tangent of the phantom tangents at one of the knots neighboring the knot is determined by performing steps including:
   determining an angle of the phantom tangent such that the phantom tangent is parallel to a line between knots neighboring the one of the knots; and
   determining a respective length of each side of the phantom tangent as a second ratio of a horizontal distance between the one of the knots and a knot on the side that neighbors the one of the knots.

6. The method of claim 5, wherein the second ratio has a value of 1/4.

7. The method of claim 1, wherein the steps of, for each knot of the plurality of knots, determining phantom tangents, determining the respective length of each side of the tangent, determining the respective initial angle of each side of the tangent, reconciling the initial angles, and determining the curve are performed in real time responsive to the modification to the at least one knot made by a user.

8. The method of claim 1, wherein the object is a three-dimensional (3D) virtual object.

9. A non-transitory computer-readable storage medium storing a program, which, when executed by a processor performs operations for animating an object, the operations comprising:
   receiving a modification to at least one knot;
   for each knot of a plurality of knots:
      determining phantom tangents to a curve at knots neighboring the knot,
      determining a respective length of each side of a tangent to the curve at the knot as a first ratio of a horizontal distance between the knot and a neighboring knot on the side,
      determining a respective initial angle of each side of the tangent at the knot by pointing a tip of the tangent at a near tip of one of the phantom tangents on the side, and
      reconciling the initial angles via a weighted average of the initial angles;
   determining the curve based, at least in part, on the plurality of knots and the tangents at the plurality of knots; and
   generating an animation of the object using the determined curve.

10. The computer-readable storage medium of claim 9, wherein the weighted average has form FinalAngle=((1−

A)×L)+(A×S), L being a larger of the initial angles, S being a smaller of the initial angles, and A=$q^q$, where q=L/(L+S).

11. The computer-readable storage medium of claim 9, wherein the plurality of knots includes the at least one knot that is modified and knots that are two or fewer knots away from the at least one knot that is modified.

12. The computer-readable storage medium of claim 9, wherein the first ratio is a user-adjustable parameter with a default value of 1/3.

13. The computer-readable storage medium of claim 9, wherein each phantom tangent of the phantom tangents at one of the knots neighboring the knot is determined by performing steps including:
    determining an angle of the phantom tangent such that the phantom tangent is parallel to a line between knots neighboring the one of the knots; and
    determining a respective length of each side of the phantom tangent as a second ratio of a horizontal distance between the one of the knots and a knot on the side that neighbors the one of the knots.

14. The computer-readable storage medium of claim 13, wherein the second ratio has a value of 1/4.

15. The computer-readable storage medium of claim 9, wherein the steps of, for each knot of the plurality of knots, determining phantom tangents, determining the respective length of each side of the tangent, determining the respective initial angle of each side of the tangent, reconciling the initial angles, and determining the curve are performed in real time responsive to the modification to the at least one knot made by a user.

16. The computer-readable storage medium of claim 9, wherein the object is a three-dimensional (3D) virtual object.

17. A system, comprising:
    a processor; and
    a memory, wherein the memory includes an application program configured to perform operations for animating an object, the operations comprising:
        receiving a modification to at least one knot,
        for each knot of a plurality of knots:
            determining phantom tangents to a curve at knots neighboring the knot;
            determining a respective length of each side of a tangent to the curve at the knot as a first ratio of a horizontal distance between the knot and a neighboring knot on the side;
            determining a respective initial angle of each side of the tangent at the knot by pointing a tip of the tangent at a near tip of one of the phantom tangents on the side; and
            reconciling the initial angles via a weighted average of the initial angles,
        determining the curve based, at least in part, on the plurality of knots and the tangents at the plurality of knots, and
        generating an animation of the object using the determined curve.

18. The system of claim 17, wherein the weighted average has form FinalAngle=((1−A)×L)+(A×3), L being a larger of the initial angles, S being a smaller of the initial angles, and A=$q^q$, where q=L/(L+S).

19. The system of claim 17, wherein the first ratio is a user-adjustable parameter with a default value of 1/3.

20. The system of claim 17, wherein each phantom tangent of the phantom tangents at one of the knots neighboring the knot is determined by performing steps including:
    determining an angle of the phantom tangent such that the phantom tangent is parallel to a line between knots neighboring the one of the knots; and
    determining a respective length of each side of the phantom tangent as 1/4 of a horizontal distance between the one of the knots and a knot on the side that neighbors the one of the knots.

* * * * *